United States Patent [19]

Uno et al.

[11] Patent Number: 5,074,682
[45] Date of Patent: Dec. 24, 1991

[54] SEMICONDUCTOR LASER MODULE AND POSITIONING METHOD THEREOF

[75] Inventors: Saburo Uno, Kawasaki; Takayuki Masuko, Koganei; Kaoru Moriya, Kawasaki; Masayuki Siga, Yokohama, all of Japan

[73] Assignee: Fujitsu Limited, Kanagawa, Japan

[21] Appl. No.: 439,026

[22] PCT Filed: Mar. 1, 1989

[86] PCT No.: PCT/JP89/00212
§ 371 Date: Nov. 2, 1989
§ 102(e) Date: Nov. 2, 1989

[87] PCT Pub. No.: WO89/08277
PCT Pub. Date: Sep. 8, 1989

[30] Foreign Application Priority Data

Mar. 2, 1988 [JP] Japan .................... 63-49069
Mar. 25, 1988 [JP] Japan .................... 63-72643

[51] Int. Cl.⁵ .............................................. G02B 6/42
[52] U.S. Cl. .................................... 385/93; 385/33
[58] Field of Search .............. 350/96.2, 96.18, 96.15

[56] References Cited

U.S. PATENT DOCUMENTS 3,617,129 11/1971 Skolnick .................... 350/375
4,790,618 12/1988 Abe .......................... 350/96.15
4,803,689 2/1989 Shibanuma ............... 350/96.2 X
4,836,635 6/1989 De Amorim ............... 350/96.2
4,981,335 1/1991 Gaebe ....................... 350/96.18

FOREIGN PATENT DOCUMENTS

61-167912 7/1986 Japan .................. 350/96.15
61-239208 10/1986 Japan .................. 350/96.15
62-52511 3/1987 Japan .................. 350/96.15
62-71910 4/1987 Japan .................. 350/96.15

Primary Examiner—John D. Lee
Assistant Examiner—John Ngo
Attorney, Agent, or Firm—Staas & Halsey

[57] ABSTRACT

A semiconductor laser module comprises a semiconductor laser chip for emitting a laser beam, a collimator lens for collimating the laser beam to a collimated beam, a focussing lens for focussing the collimated beam, and an optical fiber having an inclined input face to which the laser beam from the focussing lens in input. The focussing lens is arranged in such a manner that the optical axis of the collimated beam incident on the focussing lens is deviated from a center axis of the focussing lens, and the optical fiber is arranged in parallel to the collimated beam in such a manner that the laser beam is incident on an optical axis of the optical fiber.

17 Claims, 5 Drawing Sheets

SEMICONDUCTOR LASER MODULE AND POSITIONING METHOD THEREOF

BACKGROUND OF THE INVENTION

1. Field of the Invention

This invention relates to a semiconductor laser module wherein a semiconductor laser chip and an optical fiber are combined, and a method of positioning the components of such a semiconductor laser module.

2. Description of the Background Art

A single mode optical fiber having a core, the diameter thereof being relatively small (for example, 10 μm), is now widely used as an optical transmission path, since the transmission loss thereof is relatively low and it can be applied to a wide frequency range.

To obtain a long distance transmission by such an optical fiber, an optical beam emitted from a semiconductor laser at an emission angle must be connected to a small incident face of the optical fiber with a high coupling efficiency.

If the laser beam is reflected at the connecting portions of the optical fiber or in optical devices in the optical paths, and if the reflected beam is returned to the semiconductor laser, the oscillation of the laser beam emission becomes unstable and, as a result, noise in the laser beam signal may be increased. Therefore, a semiconductor laser module having an isolation function is required.

Also, the components, such as the semiconductor laser, collimator lens, focussing lens, and the like, including in the semiconductor laser module, must be precisely positioned relative to each other, so that a laser beam emitted from the semiconductor laser is introduced to the optical fiber with a high coupling efficiency.

In the prior art, a known semiconductor laser module comprises: a semiconductor laser chip for emitting a laser beam, a collimator lens for collimating the laser beam to a collimated beam, a focussing lens for focussing the collimated beam, and an optical fiber having an inclined input face to which the laser beam from the focussing lens is input. Such an inclined input face of the optical fiber is advantageous for preventing a return of the laser beam reflected at the input face to the semiconductor laser.

SUMMARY OF THE INVENTION

An object of the present invention is to provide a semiconductor laser module and a method of positioning the components thereof, in which, even if a laser beam emitted from a semiconductor laser chip is reflected at the input face, the reflected light beam is prevented from returning to the semiconductor laser chip.

Another object of the present invention is to provide a semiconductor laser module and a method of positioning the components thereof, in which the positions of these components, such as a semiconductor laser chip, a collimator lens, a focussing lens, and an optical fiber are easily and precisely adjusted and fixed relative to each other.

According to the present invention, there is provided a semiconductor laser module comprising: a semiconductor laser chip for emitting a laser beam; a collimator lens for collimator the laser beam to a collimated beam; a focussing lens having a center axis for focussing the collimated beam; and an optical fiber having an optical axis and an inclined input end face to which the laser beam from the focussing lens is input, characterized in that the focussing lens is arranged in such a manner that the collimated beam incident to the focussing lens has an optical axis deviated from the center axis of the focussing lens, and the optical fiber is arranged in parallel to the collimated beam in such a manner that the laser beam is incident on the optical fiber along the optical axis thereof.

In an embodiment of this invention, the focussing lens comprises a first lens having a center axis thereof and a second lens having a center axis thereof; the collimated beam from the collimator lens is incident on the first lens in such a manner that an optical axis of the laser beam emitted therefrom is in parallel to the center axis of the first lens; and the laser beam incident on the second lens is refracted therein in such a manner that the laser beam output from the second lens is incident on the optical fiber along the optical axis thereof.

In another embodiment of this invention, the semiconductor laser module further comprises: a first housing containing the semiconductor laser chip and the collimator lens; a second housing containing the first lens; a third housing containing the second lens; and a forth housing containing the optical fiber; the first and second housing being connected to each other in such a manner that the laser beam output from the first lens is parallel to the center axis of the first lens; the third and forth housings being connected to each other in such a manner that the laser beam incident on the second lens is in parallel to the center axis of the second lens, and thus the laser beam output therefrom is incident on the optical fiber along the optical axis thereof; and the second and third housings being connected to each other in such a manner that the parallel laser beam output from the first lens conforms to the collimated laser beam incident on the second lens.

Preferably an axial distance between the second and third housings is adjusted in such a manner that the laser beam output from the second lens is focused on the inclined input end face and incident on the optical fiber along the optical axis thereof.

In still another embodiment of this invention, the semiconductor laser module further comprises means for mounting the semiconductor laser chip and the collimator lens, this mounting means comprising: a cylindrical lens holder for fixedly holding the collimator lens, the lens holder having an outer thread portion; a spacer member having an inner thread hole with which the outer thread portion of the lens holder is engaged; a chip carrier for fixedly holding the semiconductor laser chip, the chip carrier having a flat surface to which the spacer is fixedly adhered; and means for fixing the lens holder to the spacer and the spacer to the chip carrier by, for example, a laser weld.

According to another aspect of the present invention, there is provided a method of positioning a semiconductor laser module comprising a semiconductor laser chip for emitting a laser beam; a collimator lens for collimating the laser beam to a collimated beam; a focussing lens having a center axis for focussing the collimated beam; and an optical fiber having an output end and an input end having an inclined input face to which the laser beam from the focussing lens is input, characterized in that the method comprises the following steps of arranging a monitoring device at an incident side of the focussing lens; inputting a light beam from the output end of the optical fiber in such a manner that the light beam is transmitted through the optical fiber, discharged from the input end, and input through the focussing lens to the monitoring device; rotating the focussing lens so that the light beam traces a predetermined circle in the monitoring device; and adjusting the focussing lens in the radial direction with respect to the axis of the optical fiber so that the light beam is positioned at the center of the circle.

In still another aspect of this invention, there is provided a semiconductor laser module comprising, in series: a semiconductor laser chip for emitting a laser beam; a collimator lens for collimating the laser beam to a collimated beam; an optical isolator; a front half of a divided refractive index distribution type lens (i.e., Grin rod lens); and a rear half of the divided Grin rod lens, and an optical fiber having an optical axis and an inclined input end face, and further comprising a laser side assembly for combining, in position, the semiconductor laser chip, the collimator lens, and the front half of the divided Grin rod lens; an intermediate assembly comprising means for fixedly holding the front half of the divided Grin rod lens; a fiber side assembly comprising an inner cylinder for fixedly holding the optical fiber, an outer cylinder into which the inner cylinder is adjustably inserted in the axial direction, a cylindrical lens holder for fixedly holding the rear half of the divided Grin rod lens; the cylindrical lens holder being mounted on the inner cylinder so as to be radially adjustable with respect to the optical axis of the fiber; and the laser assembly being fixed to the intermediate lens assembly and, in turn, the intermediate lens assembly being fixed to the fiber assembly.

DESCRIPTION OF THE PREFERRED EMBODIMENT

Before explaining the embodiments of this invention, a basic principle of a semiconductor laser module will be described with reference to FIGS. 1 to 3, in which A denotes a semiconductor laser chip for emitting a laser beam; B, a collimator lens for collimating the laser beam to a collimated beam; C, a focussing lens for focussing the collimated beam; and D, an optical fiber having a center core E and an inclined input face to which the laser beam from the focussing lens is input.

Figure 2:
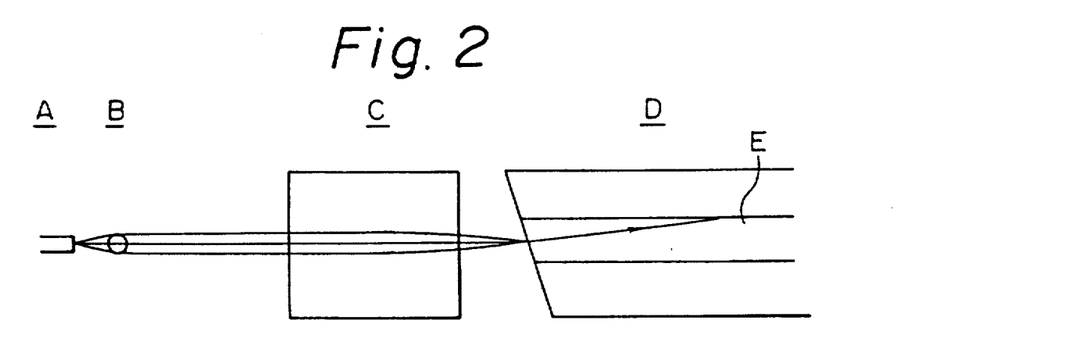
FIG. 2 shows another optical path.

As shown in FIG. 2, if the focussing lens C and the optical fiber D are arranged in such a manner that the center axis and core axis thereof conform to the optical axis of the collimated beam from the collimator lens B, the incident laser beam is refracted at the inclined inlet face and does not travel along the core axis of the optical fiber D and, therefore, the optical coupling efficiency of is reduced.

Figure 3:
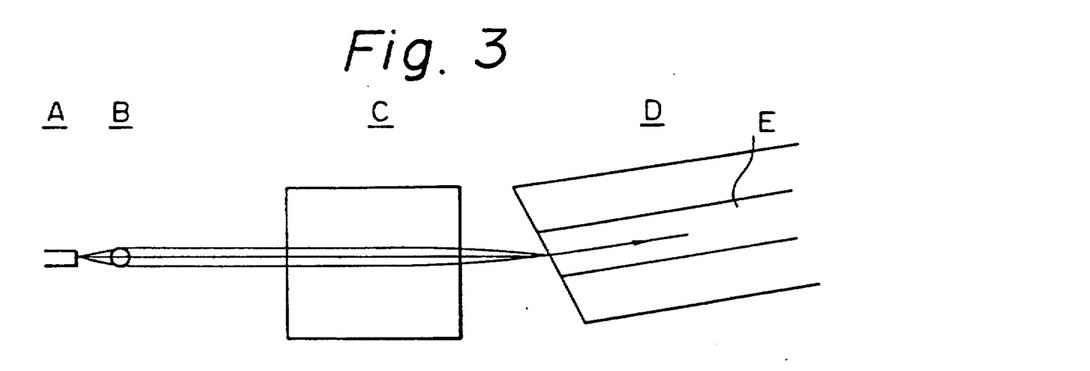
FIG. 3 shows still another optical path.

Accordingly, as shown in FIG. 3, if the optical fiber D is arranged to be inclined so that the refracted laser beam is incident along the core axis of the optical fiber, although the focussing lens C is arranged in the same manner as in FIG. 2, the efficiency of the optical coupling is clearly increased. Nevertheless, since the optical fiber D must be inclined with respect to the center axis of the focussing lens C, the components of the semiconductor laser module cannot be easily and precisely positioned.

Figure 1:
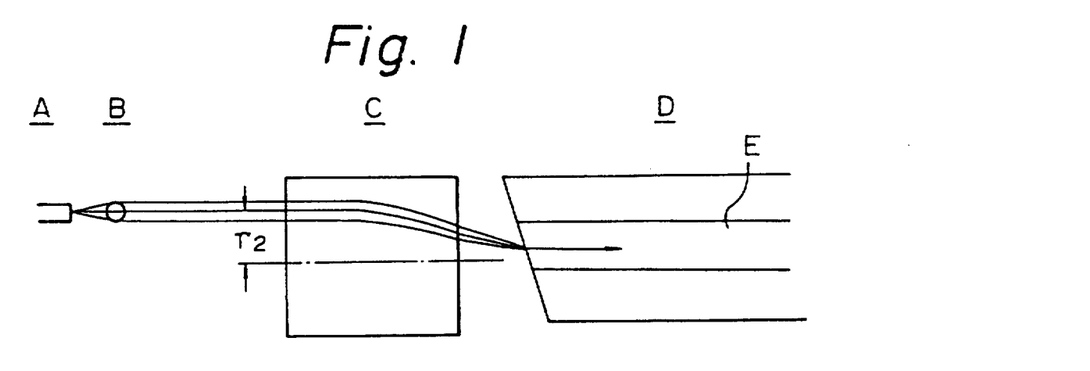
FIG. 1 is a schematic illustration showing an optical path in a semiconductor laser module of this invention.

Therefore, according to the present invention, as shown in FIG. 1, the focussing lens C is arranged in such a manner that the optical axis of the collimated beam incident on the focussing lens C is deviated from the center axis of the focussing lens C, and due to this deviation, the incident laser beam is refracted at the inclined inlet face and travels along the core axis of the optical fiber D; although the optical fiber D can be arranged in such a manner that the core axis thereof is in parallel to the optical axis of the collimated beam from the collimator lens B, in the same manner as FIG. 2. Accordingly, the efficiency of the optical coupling is increased and the components of the semiconductor laser module can be easily and precisely positioned.

The relative positions of the optical fiber and the focussing lens can be determined by a basic geometrical calculation as described below with reference to FIGS. 4 and 5. In principle, the light beam travels either from left to right or vice versa, but in FIG. 4, the light beam travels the same optical path.

Figure 4:
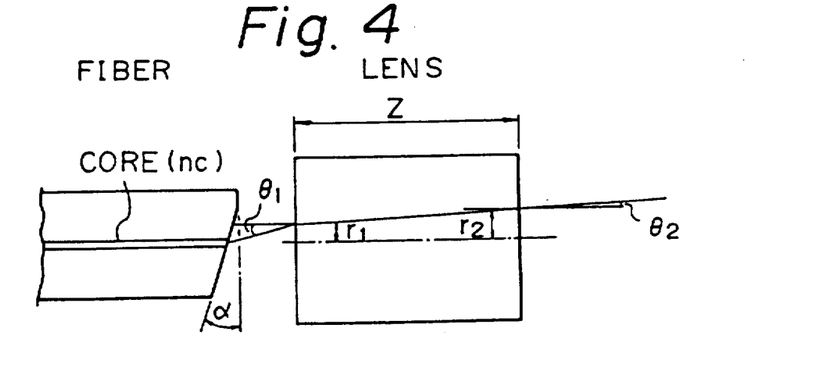
FIG. 4 is a schematic illustration showing an arrangement of a focussing lens and an optical fiber in this invention.

Therefore, assuming that the light beam travels from left to right in FIG. 4:

Here, nc: refractive index of the fiber core a: angle of the inclined face of the optical fiber A: constant of distribution of refractive index of the focussing lens $\theta_1$: incident angle from the focussing lens $\theta_2$: output angle from the focussing lens $r_1$: radial distance of the focussing lens, from incident position to center axis $r_2$: radial distance of the focussing lens, from output position to center axis Z: axial length of the focussing lens $$Z = \frac{2\pi p}{\sqrt{A}} \quad (p: \text{pitch of the lens})$$

n(γ): refractive index of the focussing lens;
n(γ) is given by the following equation:

$$n(\gamma) \approx n_0(1 - \tfrac{1}{2}A r^2) \quad (1)$$

The light beam travels along an optical path given by a geometrical calculation was follows:

$$\begin{pmatrix} r_2 \\ \tan\theta_2 \end{pmatrix} = \begin{pmatrix} \cos\sqrt{A}\cdot Z & \dfrac{1}{n_0\sqrt{A}}\sin\sqrt{A}\cdot Z \\ n_0\sqrt{A}\sin\sqrt{A}\cdot Z & \cos\sqrt{A}\cdot Z \end{pmatrix} \begin{pmatrix} r_1 \\ \tan\theta_1 \end{pmatrix} \quad (2)$$

On the other hand, the incident angle from the focussing lens (i.e., the optimum incident angle on the inclined face of the optical fiber) $\theta_1$ is given by the following equation:

$$n_0 \sin\alpha = \sin(\theta_1 + \alpha)$$

$$\theta_1 = \sin^{-1}(nc \sin\alpha) - \alpha \quad (3)$$

Assuming that $\theta_2 = 0$ in the above equation (2), $r_1$ and $r_2$ can be thus determined. In this case, $r_2$ refers to an incident position of the parallel beam in FIG. 1.

Figure 5:
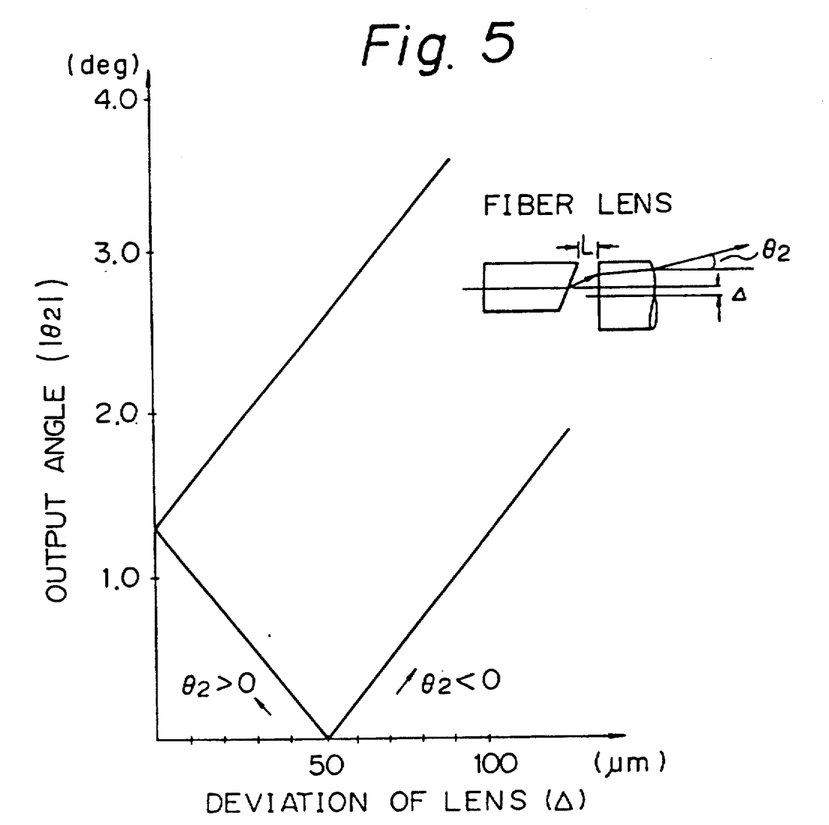
FIG. 5 is a diagram illustrating the relationship between the deviation of lens ($\Delta$) and the output angle ($\theta_2$)

In FIG. 5, the abscissa Δ (μm) indicates the deviation of lens, i.e., the distance between the optical axis of the fiber and the center axis of the focussing lens, and the ordinate $\theta_2$ indicates the angle of the light beam output from the focussing lens. The ordinate indicates the absolute value of $\theta_2$ where $\theta_2$ is increased both in the positive direction (beam output upward in FIG. 4) and in the negative direction (beam output downward in FIG. 4).

The numerical conditions of the diagram shown in FIG. 5 are as follows:

nc (refractive index of fiber core) = 1.592
A = 0.327 (mm)$^{-1}$
p (pitch of the lens) = 0.16
α (angle of the inclined incident face) = 6°
(axial distance between fiber and lens) = 0.05 mm
Therefore, in this instance, Δ = 50 μm A divided refractive index distribution type lens which can be advantageously used in an embodiment of this invention will now be described with reference to FIG. 6.

The refractive index distribution type lens (Grin rod lens) is a cylindrical rod lens in which the refractive index is gradually reduced away from a center axis thereof. Therefore, a light beam incident in parallel to the center axis travels in the lens through an optical path of a sine-curve wave.

Therefore, in a Grin rod lens having a ¼ pitch length, a collimated light beam incident on one end face thereof is focussed at a center position of the other end face.

Figure 6:
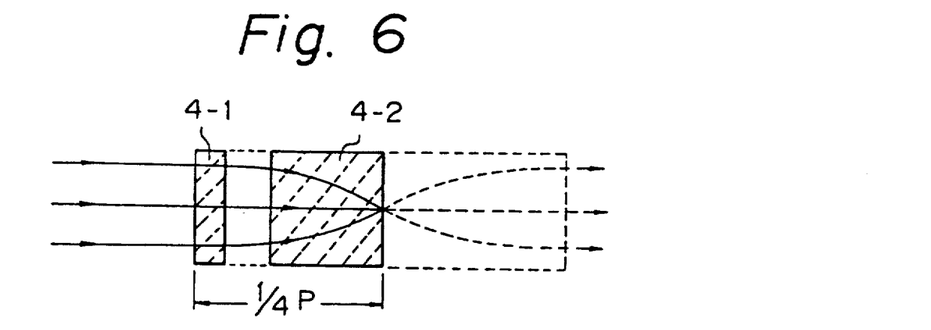
FIG. 6 shows an optical path of a divided Grin rod lens.

If such a Grin rod lens having a ¼ pitch length is cut at a desired position spaced from the incident end face and a thin disc portion if removed therefrom, a new divided Grin rod lens comprising a front half 4-1 and a rear half 4-2 as shown in FIG. 6 can be provided.

In such a divided Grin rod lens comprising a front half 4-1 and a rear half 4-2, the axial distance between the front and rear halves 4-1 and 4-2 is preferably such that a light beam incident in parallel to the center axis thereof on the incident face of the front half 4-1 is focussed at a desired position away from the output face of the rear half 4-2.

Figure 7:
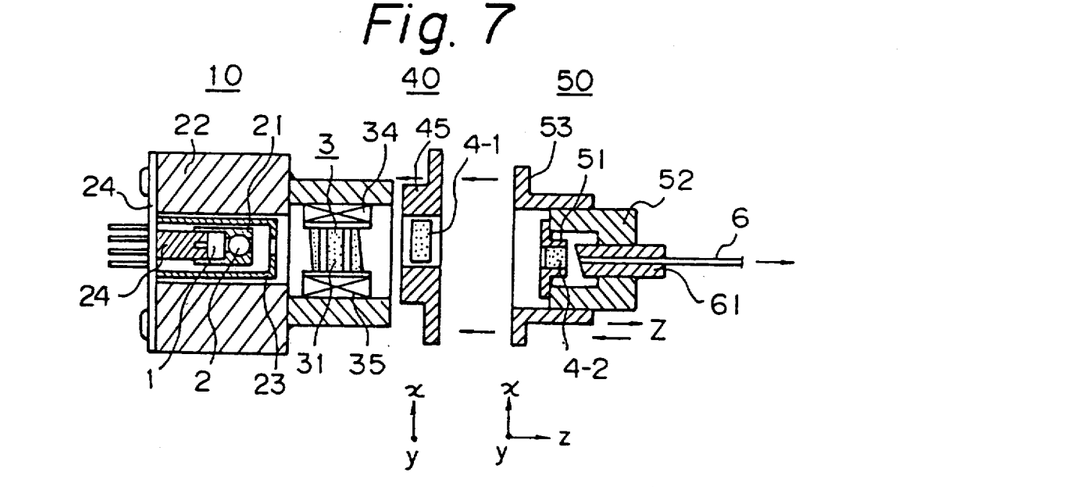
FIG. 7 is a cross-sectional view of an embodiment of a semiconductor laser module according to the present invention.

Referring now to FIG. 7, which illustrates an embodiment of a semiconductor laser module of this invention comprising a laser side assembly 10 including a semiconductor laser chip such as a laser diode 1 for emitting a cone-shaped laser beam, a collimator lens 2 for collimating the laser beam to a collimated beam, an optical isolator 3 for preventing the returned light of the laser beam; an intermediate lens assembly 40 including a front half 4-1 of a divided Grin rod lens; and a fiber side assembly 50 including a rear half 4-2 of the divided Grin rod lens and an optical fiber 6, appropriately connected to each other.

The semiconductor laser chip 1 is inserted into one end of a cylindrical hole of a holder 21 and fixed on the axis thereof. On the other hand, the collimator lens 2 is located at the other end thereof and fixed at a predetermined position so that the center axis thereof conforms to the optical axis of the laser beam emitted from the laser chip 1. The holder 21 is fixed on a stem 24, covered with a cap 23 to maintain a hermetical seal condition, and inserted into a center hole of a cylindrical package 22 made of, for example, a stainless steel. The stem 24 has a flange portion which is fixed to the end face of the package 22 by, for example, screws.

On the other hand, a Faraday rotor 31 is situated in the magnetic field of a permanent magnet 34, a polarizer and an analyzer are arranged in front of and behind the Faraday rotor 31, respectively, to constitute an optical isolator 3, which is situated in a central hole of an isolator package 35 made of, for example, a stainless steel, and fixed to the laser side assembly 10 by welding the abutting surfaces of the isolator package 35 and the package 22.

The front half 4-1 of the divided Grin rod lens is fitted into a cylindrical lens holder 45 made of, for example, a stainless steel, and having a flange portion, to constitute the intermediate lens assembly 40.

In the fiber side assembly 50, an incident end of the optical fiber 6 is fixedly inserted into a small center hole of a cylindrical ferrule 61. The incident face of the optical fiber and the cylindrical ferrule 61 is appropriately inclined by 3° to 10° with respect to the axis of the optical fiber 6.

An cylindrical inner body 52 made of, for example, a stainless steel, has a stepped central hole having smaller and larger diametrical inner portions. The cylindrical ferrule 61 is fixedly inserted into the smaller diametrical portion of the stepped central hole.

A lens holder 51 made of, for example, a stainless steel, has a flange portion and a central hole to which the rear half 4-2 of the divided Grin rod lens is fixedly inserted. The outer diameter of the lens holder 51 is smaller than the inner diameter of the larger portion of the stepped central hole of the inner cylinder 52, and the outer diameter of the flange portion of the lens holder 51 is smaller than the outer diameter of the inner cylinder 52.

An outer cylinder 53 made of, for example, a stainless steel, has a flange portion and is slidably fitted onto the outer cylindrical face of the inner cylinder 52.

As mentioned above, the fiber side assembly 50 comprises the optical fiber 6, the ferrule 61, the flanged lens holder 51, the inner cylinder 52, and the outer cylinder 53.

The fiber side assembly 50 is made as follows. The radial positions of the optical fiber 6 and the rear half 4-2 of the divided Grin rod lens are first adjusted with respect to each other and to the inner cylinder 52, and then these elements and the flagged lens holder 51 are fixed to each other by, for example, welding.

Figure 9:
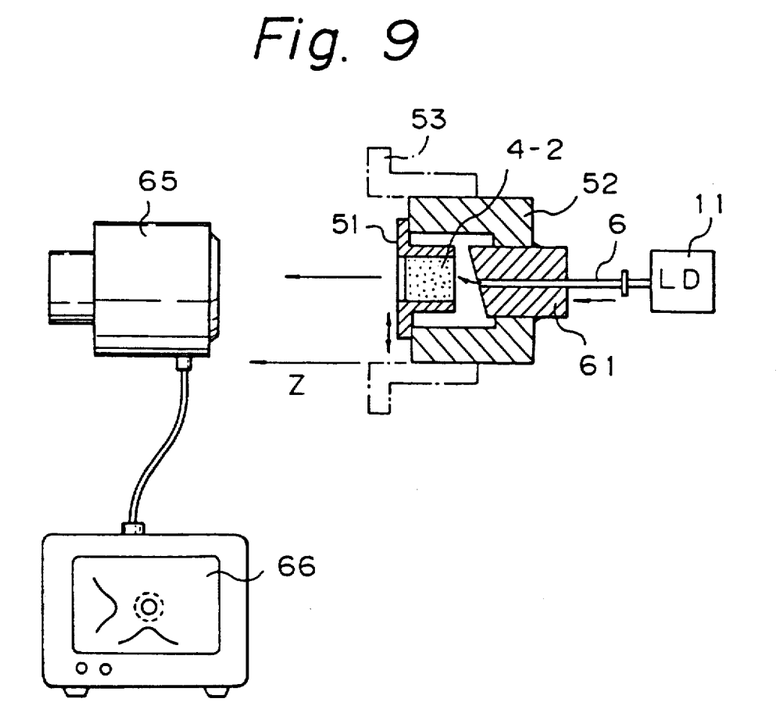
FIG. 9 illustrates a means of adjusting the semiconductor laser module of this invention.

The positioning operation will now be described in more detail with reference to FIG. 9. A light source, such as a semiconductor laser 11, is first connected to an output end of the optical fiber 6 and an infrared video camera 65 is located at the side of the rear half 4-2 of the divided Grin rod lens, and a monitor indicator 66 is connected to the infrared video camera 65.

Therefore, while the monitor indicator 66 is monitored, the flanged lens holder 51 is adjusted in the direction of the X and Y-axes, i.e., in the radial direction, in such a manner that the light beam discharged from the rear half 4-2 of the divided Grin rod lens becomes parallel to the Z-axis, i.e., the axial direction.

More particularly, the flanged lens holder 51 is rotated in the inner cylinder 52 about a selected axis (for example, the axis of the optical fiber 6), and thus the track of the light beam discharged from the rear half 4-2 of the divided Grin rod lens traces a circle in the view window of the monitor indicator 66. Then, the flanged lens holder 51 is moved and adjusted in the X and Y-axes directions, i.e., in the radial direction, in such a manner that the optical axis of the light beam discharged from the rear half 4-2 of the divided Grin rod lens becomes coaxial with the above-mentioned circle. By such an adjustment, the optical axis of the light beam discharged from the rear half 4-2 of the divided Grin rod lens becomes parallel to the axis of the optical fiber 6.

The positioning adjustment of the laser side assembly 10 and the intermediate lens assembly 40 can be performed in the same manner as above, and consequently, an end face of the laser side assembly 10 is abutted provisionally against an end face of the intermediate lens assembly 40, an infrared video camera is located at the side of the front half 4-1 of the divided Grin rod lens, and a monitor indicator is connected to the infrared video camera. Namely, adjusting operation of the intermediate lens assembly 40 is carried out in the same manner as the adjusting operation of the fiber side assembly 50.

Consequently, the light beam emitted from the semiconductor laser chip 1 and transmitted through the collimator lens 2, the optical isolator 3, and the front half 4-1 of the divided Grin rod lens is monitored by the infrared video camera, and the intermediate lens assembly 40 is adjusted in X and Y-axes directions, i.e., in the radial direction, in such a manner that the light beam discharged therefrom becomes parallel to the Z-axis. After the adjusting operation is finished, the lens holder 45 is fixed by, for example, welding, to the end face of the isolator package 35.

To fix the fiber side assembly 50 to the intermediate lens assembly 40, the end face of the outer cylinder 53 is abutted against the end face of the intermediate lens assembly 40 and a power of the light beam emitted from the semiconductor laser chip 1 is monitored at the output side of the optical fiber 6. Therefore, while the optical power is monitored, the inner cylinder 52 is slidingly moved to adjust the inner cylinder 52, and then fixed to the outer cylinder 53 by laser welding.

Then, while the end face of the lens holder 45 is abutted against the end face of the outer cylinder 53, the fiber side assembly 50 is slidably moved in the X and Y-directions, i.e., in the radial direction, in such a manner that the optical power of the light beam discharged from the optical fiber 6 is maximized. After the adjusting operation is finished, the outer cylinder 53 is fixed to the lens holder 45 by laser welding.

Figure 8:
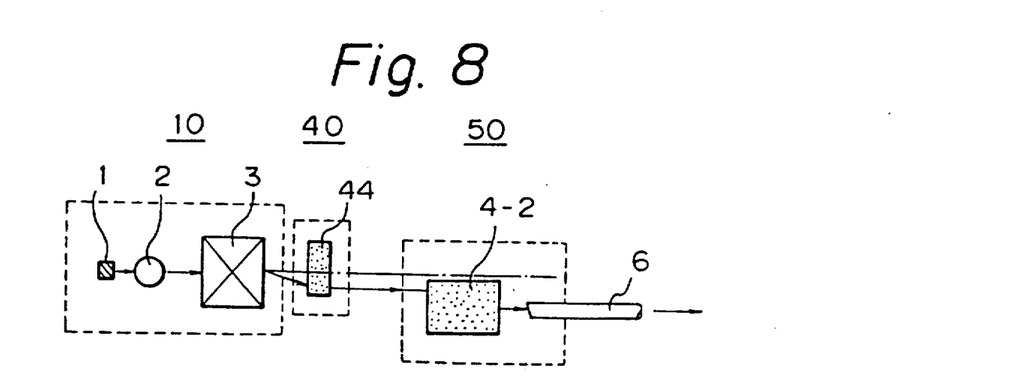
FIG. 8 shows an optical path of the semiconductor laser module of FIG. 7.

FIG. 8 illustrates the optical path of the semiconductor laser module of this embodiment constructed as mentioned above. In the laser side assembly 10, the laser beam emitted from the semiconductor laser chip 1 and diverged as a cone is collimated to a collimated beam by the collimator lens 2 and enters the optical isolator 3.

Due to a possible discrepancy between the optical axes of the semiconductor laser chip 1 and the collimator lens 2, or the like, a laser beam inclined with respect to the axis of the holder 21 may be emitted from the laser side assembly 10.

According to the embodiment described above, however, since the intermediate assembly 40 has been adjusted, the laser beam discharged from the front half 4-1 of the divided Grin rod lens is parallel to the optical axis and a converged light beam, regardless of whether the incident beam is inclined or in parallel to the center axis of the front half 4-1 of the divided Grin rod lens.

Therefore, such an optical beam enters the rear half 4-2 of the divided Grin rod lens, and while being transmitted through the rear half 4-2 of the divided Grin rod lens, the optical beam is refracted in the direction of the axis of the optical fiber 6 and is further converged. Accordingly, the optical beam is made incident on the incident face of the optical fiber 6 at an appropriate incident angle.

As clearly understood from the above, in the semiconductor laser module according to the present invention, the necessary adjustments are only in the X and Y-directions and the axial direction with respect to the optical fiber 6 and, therefore, the adjusting operation can be very easily performed and the coupling efficiency is very high.

Since the incident face of the optical fiber 6 is inclined, even if a portion of the optical beam discharged from the rear half 4-2 of the divided Grin rod lens is reflected by the end face of the optical fiber 6 and the ferrule 61 the reflected beam is not returned to the semiconductor laser chip 1, since the end face is inclined to the optical axis of the laser beam.

Also, even if a portion of the optical beam is returned through the optical fiber 6 or reflected by the front half 4-1 of the divided Grin rod lens, the return of such a beam is prevented by the optical isolator 3.

Therefore, according to the semiconductor laser module of this invention, the reflected beam is advantageously prevented from returning to the light source, i.e., the semiconductor laser chip 1.

Figure 10:
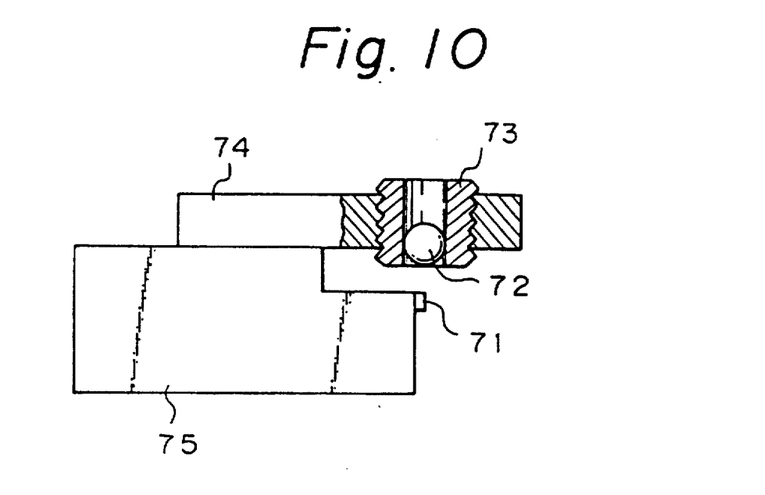
FIG. 10 is a schematic cross-sectional view of a means for mounting a semiconductor laser chip and a collimator lens in this invention.

FIG. 10 schematically illustrates a part of a laser assembly, i.e., a combination of a semiconductor laser chip and a collimator lens. The collimator lens 72 fixedly mounted on a cylindrical lens holder 73 having an outer thread portion, and the lens holder 73 is threaded into a spacer 74 fixed on the flat surface of a chip carrier 75 on which a semiconductor laser chip 71 is fixedly mounted. Therefore, the lens holder 73 is fixed to the spacer 74 and the latter is fixed, in turn, to the chip carrier 75 by, for example, laser welding.

Figure 11:
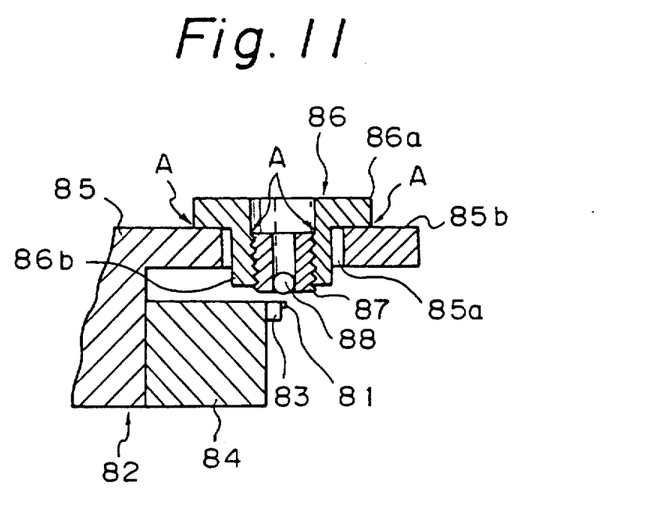
FIG. 11 is a cross-sectional view of an embodiment of the mounting means shown in FIG. 10.
Figure 12:
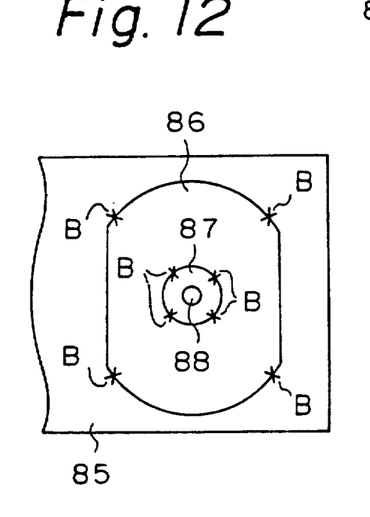
FIG. 12 is a plan view of the embodiment of the mounting means shown in FIG. 11.

FIGS. 11 and 12 are cross-sectional and plan views of an embodiment of the laser assembly. A semiconductor laser chip 81, such as a laser diode (LD), is mounted on a chip carrier 82, which comprises in this embodiment a chip mount member 83 made of, for example, a diamond, on which the LD chip 81 is directly mounted, a heat sink 84 made of, for example copper, for heat radiation, and a lens holder 85 for holding a collimator lens assembly. The lens holder 85 has a through hole 85a at a position opposite to the LD chip 81, and a spacer 86 is inserted into this through hole 85a. The spacer 86 is provided at the side opposite to the LD chip 81 with a flange 86a which has a diameter larger than the diameter of the through hole 85a, and thus the flange 86a can be slidingly moved on the flat portion 85b of the lens holder 85 to adjust the position of the spacer 86 in a plane perpendicular to the optical axis of the spacer 86. The spacer 86 has a cylindrical body 86b into which a cylindrical lens holder 87 is threaded, and a collimator lens 88, such as a spherical lens, is fixed to the inside of the lens holder 87 by, for example, press fitting. As the lens holder 87 is threadingly engaged with the spacer 86, the collimator lens 88 can be easily moved in the direction of the optical axis to adjust the focus point thereof, by rotating the lens holder 87.

After the focus and alignment adjustments of the collimator lens 88 by the threading and sliding movements are finished, laser welding beams are simultaneously irradiated as shown by arrows A and, therefore, welded spots as indicated at B are formed. Using laser beam welding, the fixing operation can be instantly completed, and thus any possible deviation of the optical axis can be advantageously, prevented, although such a deviation might occur if, for example, the components were fixed together by adhesion. Also, the optical coupling efficiency is not changed over long term use, although such a changes might occur if the components were fixed together by, for example, solder welding.

Accordingly, it is necessary to simultaneously irradiate laser welding beams onto a plurality of spots, to prevent deviation of the optical axis due to heat shrinkage which might occur unevenly in the spacer or the like during the welding.

Although the number and positions of the laser welding spots are not limited, it is advantageous to irradiate the laser welding beams at positions symmetric to the optical axis as shown in FIG. 12, to obtain a uniform heat shrinkage. Accordingly, the heat shrinkage at the various positions is compensated about the optical axis.

It is also advantageous for the spacer 86 or the lens holder 87 to have a shape such that is symmetrical to the optical axis. Therefore, under a condition of the environment in which the semiconductor laser module is used, deviation of the optical axis due to the head expansion or shrinkage due to temperature changes may be advantageously minimized by such a symmetrical shape.

Figure 13:
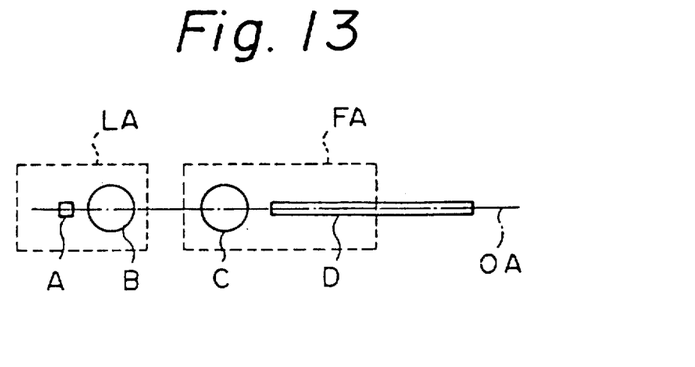
FIG. 13 is a schematic illustration of a basic arrangement of main components of a semiconductor laser module.

FIG. 13 schematically shows a semiconductor laser module including a laser assembly LA including a semiconductor laser chip A and a collimator lens B as mentioned above, and a fiber assembly FA including a focussing lens C and an optical fiber D.

We claim:

1. A semiconductor laser module, comprising:
   a semiconductor laser chip for emitting a laser beam;
   a collimator lens for collimating said laser beam to a collimated beam;
   a focussing lens having a center axis for focussing said collimated beam, said focussing lens comprising a first lens having a center axis and a second lens having a center axis;
   an optical fiber having an optical axis and an inclined input end face to which said laser beam from said focussing lens is input;
   said focussing lens is arranged in such a manner that said collimated beam incident on said focussing lens has an optical axis deviated from said center axis of said focussing lens;
   said collimated beam from said collimator lens is incident on said first lens in such a manner that an optical axis of the laser beam emitted therefrom is parallel to said center axis of the first lens; and
   said laser beam incident on said second lens is refracted therein and said optical fiber is arranged parallel to said collimated beam in such a manner that said laser beam output from said second lens is incident on said optical axis thereof.

2. A semiconductor laser module as set forth in claim 1, wherein an optical isolator is arranged between said collimator lens and said focussing lens.

3. A semiconductor laser module as set forth in claim 1 further comprising:
   a first housing containing said semiconductor laser chip and said collimator lens;
   a second housing containing said first lens;
   a third housing containing said second lens;
   a forth housing containing said optical fiber;
   said first and second housings being connected to each other in such a manner that said laser beam output from said first lens is parallel to said center axis of the first lens;
   said third and fourth housings being connected to each other in such a manner that said laser beam incident on said second lens is parallel to said center axis of the second lens, and thus the laser beam output therefrom is incident on said optical fiber along said optical axis thereof; and
   said second and third housings being connected to each other in such a manner that the collimated laser beam output from said first lens conforms to the collimated laser beam incident on said second lens.

4. A semiconductor laser module as set forth in claim 3, wherein an axial distance between said second and third housings is adjusted in such a manner that the laser beam output from said second lens is focused at said inclined input end face and incident on said optical fiber along said optical axis thereof.

5. A semiconductor laser module as set forth in claim 1, further comprising means for mounting said semiconductor laser chip and said collimator lens, said mounting means comprises:
   a cylindrical lens holder for fixedly holding said collimator lens, said lens holder having an outer thread portion;
   a spacer member having an inner thread hole with which said outer thread portion of the lens holder is engaged;
   a chip carrier for fixedly holding said semiconductor laser chip, said chip carrier having a flat surface to which said spacer is fixedly adhered; and
   means for fixing said lens holder to said spacer and said spacer to said chip carrier by welding.

6. A semiconductor laser module as set forth in claim 1, wherein said semiconductor laser module is positioned by a method comprising the following steps of:
   arranging a monitoring device at an incident side of focussing lens;

inputting a light beam from an output end of the optical fiber in such a manner that said light beam is transmitted through said optical fiber, discharged from said inclined input end face, and input through said focussing lens to said monitoring device;

rotating said focussing lens so that said light beam traces a predetermined circle in said monitoring device; and adjusting said focussing lens in the radial direction with respect to the axis of said optical fiber so that said light beam is positioned at the center of said circle.

7. A semiconductor laser module as set forth in claim 6 wherein said monitoring device comprises an infrared video camera and an optical view window on which an image of said light beam is obtained, and said light beam input from said output end of the optional fiber is an infrared ray.

8. A semiconductor laser module as set forth in claim 6 wherein said second lens is arranged opposite to said inclined input end face of the optical fiber; said first lens is arranged at the output side of said collimator lens; and said semiconductor laser chip and said collimator lens are accommodated in a housing, and wherein said first lens is positioned with respect to said housing in the following manner:

arranging a monitoring device at an incident side of said first lens;

inputting a laser beam from said semiconductor laser chip to said monitoring device through said collimator lens and said first lens;

rotating said first lens so that said laser beam traces a predetermined circle in said monitoring device; and adjusting said first lens in the radial direction with respect to an axis of said housing so that said laser beam is positioned at the center of said circle.

9. A semiconductor laser module as set forth in claim 8, wherein an optical isolator is arranged between said collimator lens and said first lens.

10. A semiconductor laser module as est forth in claim 8, wherein said semiconductor laser module further comprises: a first housing containing said semiconductor laser chip and said collimator lens, a second housing containing said first lens; a third housing containing said second lens; and a fourth housing containing said optical fiber; said method of positioning said semiconductor laser module further comprising the following steps of:

adjusting the positions of said first and second housings relative to each other;

adjusting the positions of said third and fourth housings relative to each other; and adjusting the positions of said second and third housings relative to each other, so that the light beam from said optical fiber conforms to the laser beam from said semiconductor laser chip.

11. A semiconductor laser module as est forth in claim 10, wherein an axial distance between said second and third housings is adjusted in such a manner that the laser beam output from said second lens accommodated in said third housing is focussed on a core axis position of said inclined input end of said optical fiber accommodated in said fourth housing.

12. A semiconductor laser module as set forth in claim 10, wherein said semiconductor laser module further comprises: means for mounting said semiconductor laser chip and said collimator lens, said mounting means comprising: a cylindrical leans holder for fixedly holding said collimator lens, said cylindrical lens holder having an outer threaded portion; a spacer member having an inner threaded hole with which said outer threaded portion of the cylindrical lens holder is engaged; a chip carrier for fixedly holding said semiconductor laser chip, said chip carrier having a flat surface to which said spacer member is adhered; said method of positioning said semiconductor laser module further comprising the following steps of:

adjusting the position of said spacer member on said flat surface of the chip carrier in such a manner that the optical axis of the laser beam output from said semiconductor laser chip conforms to that of the collimator lens;

rotating said cylindrical lens holder in said threaded hole of the spacer member in such a manner that the laser beam output from said collimator lens becomes a collimated beam; and fixing said cylindrical lens holder to said spacer member and said spacer member to said chip carrier by welding.

13. A semiconductor laser module, comprising:

a semiconductor laser chip for emitting a laser beam;

a collimator lens for collimating said laser beam to a parallel beam;

an optical isolator;

a front half of a divided Grin rod lens;

a rear half of said divided Grin rod lens;

an optical fiber having an optical axis and an inclined input end face;

a laser side assembly for combining, in position, said semiconductor laser chip, said collimator lens, and said front half of the divided Grin rod lens;

an intermediate lens assembly comprising means for fixedly holding said front half of the divided Grin rod lens;

a fiber side assembly comprising an inner cylinder for fixedly holding said optical fiber, an outer cylinder into which said inner cylinder is inserted adjustably in the axis direction, and a cylindrical lens holder for fixedly holding said rear half of the divided Grin rod lens;

said cylindrical holder being mounted on said inner cylinder as to be radially adjustable with respect to said optical axis of said optical fiber; and said laser side assembly being fixed to said intermediate lens assembly and, in turn, said intermediate lens assembly being fixed to said fiber side assembly.

14. A semiconductor laser module as est forth in claim 13, wherein said cylindrical lens holder has a radial flange which is in contact with an end face of said inner cylinder.

15. A semiconductor laser module as set forth in claim 13, further comprising mounting means for mounting said semiconductor laser chip and said collimator lens, said mounting means comprising:

a cylindrical lens holder for fixedly holding said collimator lens, said cylindrical lens holder having an outer threaded portion;

a spacer member having an inner threaded hole with which said outer threaded portion of the cylindrical lens holder is engaged;

a chip carrier for fixedly holding said semiconductor laser chip, said chip carrier having a flat surface to which said spacer member is fixedly adhered; and means for fixing said cylindrical lens holder to said spacer member and said spacer member to said chip carrier by welding.

16. A semiconductor laser module as set forth in claim 13, wherein said optical isolator comprises a Faraday rotor having respective ends providing with a polarizer and an analyzer, respectively.

17. A semiconductor laser module as set forth in claim 13, wherein each of said assemblies comprises a housing made of a stainless steel, and said housings of the assemblies are connected to each other by laser welding.

* * * * *